(12) United States Patent
Kraus (10) Patent No.: US 7,620,745 B2
(45) Date of Patent: Nov. 17, 2009

(54) TRANSFERRING DATA BETWEEN A MEMORY AND PERIPHERAL UNITS EMPLOYING DIRECT MEMORY ACCESS CONTROL

(75) Inventor: Jochen Kraus, München (DE)

(73) Assignee: Infineon Technologies AG, Munich (DE)

( * ) Notice: Subject to any disclaimer, the term of this patent is extended or adjusted under 35 U.S.C. 154(b) by 251 days.

(21) Appl. No.: 11/235,945

(22) Filed: Sep. 27, 2005
(Under 37 CFR 1.47)

(65) Prior Publication Data

US 2007/0192515 A1 Aug. 16, 2007

(30) Foreign Application Priority Data

Sep. 27, 2004 (DE) .................. 10 2004 046 822

(51) Int. Cl.
*G06F 3/00* (2006.01)
*G06F 13/00* (2006.01)
(52) U.S. Cl. .................. 710/22; 710/6; 710/25; 710/40

(58) Field of Classification Search .................. None
See application file for complete search history.

(56) References Cited

U.S. PATENT DOCUMENTS

| 5,379,381 A | 1/1995 | Lamb |
| 5,619,727 A * | 4/1997 | Chen et al. .................. 710/22 |
| 5,948,080 A | 9/1999 | Baker |
| 6,266,715 B1 * | 7/2001 | Loyer et al. .................. 710/22 |
| 2002/0093930 A1* | 7/2002 | Dertz et al. .................. 370/337 |
| 2005/0188122 A1* | 8/2005 | Hayden .................. 710/23 |

FOREIGN PATENT DOCUMENTS

WO    WO 2004/061687    7/2004

* cited by examiner

*Primary Examiner*—Tariq R. Hafiz
*Assistant Examiner*—Scott Sun
(74) *Attorney, Agent, or Firm*—Dicke, Billig & Czaja, PLLC (57) ABSTRACT

A method transfers data between a memory and peripheral units. The method includes assigning priorities to the data to be transferred, and transferring the data by direct memory access (DMA) control between the memory and the peripheral units in conformity with the priorities assigned in each case.

24 Claims, 3 Drawing Sheets

TRANSFERRING DATA BETWEEN A MEMORY AND PERIPHERAL UNITS EMPLOYING DIRECT MEMORY ACCESS CONTROL

CROSS-REFERENCE TO RELATED APPLICATIONS

This Utility Patent Application claims priority to German Patent Application No. DE 10 2004 046 822.2, filed on Sep. 27, 2004, which is incorporated herein by reference.

BACKGROUND

In typical computer- or machine-aided applications, a considerable proportion of the computer operations relates to the transfer of data between an internal memory and external peripheral units or modules. A simple example is the loading of data from an external data memory into the main memory of a computer, so that the processor referred to as central processing unit (CPU) can access these data and process them. In reverse, it is frequently necessary to transfer the data stored at different memory locations to various input/output devices or to write data into the memory from these input/output devices. To relieve the processor of the task of data transfer, DMA controllers are often used for this. If the processor ascertains that an input or output of data is required, relevant commands are transmitted by the processor to the DMA controller, wherein these commands may comprise in particular the address of the data to be transferred, the volume of the data to be transferred and the destination of the data transfer. The DMA controller then carries out the data transfer on the basis of these commands, wherein the processor can in the meantime continue with other operations until an interrupt generated by the DMA controller indicates the end of the data transfer. In this way, an appreciable amount of time can be saved owing to the support of the DMA controller.

DMA controllers are also used in systems with broadband access, in particular with DSL access. Conventionally a modem is used for internet access in home applications with broadband access, wherein an even data stream is transferred. The DMA controllers used in conventional broadband systems here transfer the data from various peripheral units (e.g., bus adapter, DSL line, Ethernet switch, etc.) to the memory of the system (i.e., in the receiving direction) and from the memory to the various peripheral units (i.e., in the sending direction) according to a simple "round robin" algorithm, without quality of service (QoS) being supported, even if the peripheral units themselves may possibly support QoS. This data transfer mechanism is adequate for purely data applications, though future needs in broadband systems in particular for home applications may possibly not be met by this.

Modern hardware components for wide area network (WAN) networks (e.g., gateways, routers, DSLAMs, etc.) are normally capable of supporting QoS for different data streams, without, however, QoS so far being fully implemented into the hardware of modems for broadband access. There are different reasons for this, one reason being in particular that the market for home applications with broadband access is subject to extreme price pressure.

Nevertheless, it is still desirable that every component involved in a data transfer in the different network systems is capable of effectively supporting QoS, in order to keep the overall delay time fluctuations, also known as "jitters," to a minimum. This desire to minimize jitters will increase as the need for transfer of both voice information and items of video information and data streams via the internet using a broadband access continually increases, in particular for home applications.

SUMMARY

One aspect of the present invention provides a method for transferring data between a memory and peripheral units. The method includes assigning priorities to the data to be transferred. The method includes transferring the data by direct memory access (DMA) control between the memory and the peripheral units in conformity with the priorities assigned in each case.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to transferring data between a memory and several peripheral units, such as, for example, a bus adapter, a digital subscriber line (DSL) terminal, a switch or a router, etc., employing direct memory access control (DMA). In one embodiment of a DMA method or a DMA control device (DMA controller), which supports quality of service (QoS) even for home broadband applications, the transferring of data is in both the sending and the receiving directions.

In one embodiment, priorities are assigned to the data to be transferred, the data being transferred by the DMA control between the memory and the individual peripheral units in conformity with the priorities assigned in each case.

In one embodiment, the assigning of priorities is accomplished for the sending and receiving directions independently of one another, wherein in the receiving direction the DMA control is informed of the priorities by the peripheral units, whereas in the sending direction the priorities are fixed by a processor which is supported or relieved by the processor, wherein the processor may be in particular an "embedded processor" constructed on the same silicon substrate as the DMA control. In one embodiment, the priorities are fixed in the form of several priority classes depending on the respective data type, the priority classes or priorities indicating increasing importance, according to the following order, for example: user data, video data, voice data, and management data.

In one embodiment, the prioritization also allows full implementation of the quality of service feature in systems with broadband access for home applications, in order thus to balance out or keep to a minimum fluctuations in the transit time (i.e., "jitters") for the different data streams. Those data to which a higher priority has been assigned are operated first by the DMA control, both in the sending direction and in the receiving direction. If other data with a higher priority are present during transfer of data with a specific priority, the current data transfer is interrupted, in order to be able to transfer the data with the higher priority. Only after completion of the data transfer of the data with the higher priority is the data transfer of the original data continued. This guarantees that those data which have the highest priority or which are of the greatest importance are always transferred first in both the sending direction and in the receiving direction.

To produce the previously described priority scheme several logical channels can be provided in the DMA control, one logical channel being assigned in each case to a specific peripheral unit or a specific peripheral module, for example a bus adapter, a DSL line or an Ethernet switch, etc. Within the DMA control the relevant priorities are then allocated to the individual logical channels depending on the priorities communicated in each case. In one embodiment, a descriptor list is also used with a separate descriptor list being provided and filed in the memory for each logical channel. Each descriptor on the descriptor list may comprise a data pointer to the address of a relevant data section in the memory and an item of information on the length of the relevant data. Moreover, the descriptor may also comprise status/control bits. The use of these descriptors enables the DMA control, in particular in the sending direction, to read out the data filed in the memory by the processor, to process them and transfer them to the relevant peripheral unit in each case according to their assigned priority.

In one embodiment, a DMA manager is used within the DMA control as interface to the allocated processor, in order to transfer control, configuration and/or status information and interrupts to the processor. The descriptors filed in the memory are processed in particular by a descriptor manager of the DMA control, which among other things coordinates the accesses to the descriptors filed in the memory.

Embodiments of the present invention can be used in DMA controls for broadband data transfer networks to support the QoS feature, but the present invention is not restricted to this area of application, and can basically be implemented in any kind of DMA control.

Figure 2:
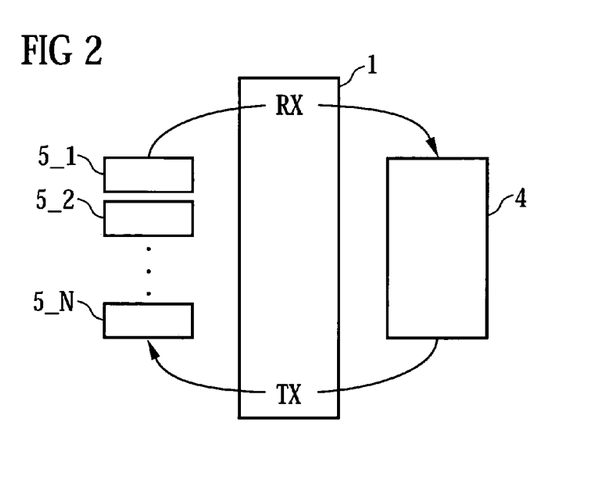
FIG. 2 illustrates a schematic illustration to elucidate the data transfer using a DMA controller according to one embodiment.

In one embodiment, as illustrated in FIG. 2, DMA controller 1 controls or coordinates the data transfer between a memory 4 and several peripheral units or peripheral modules 5_1 . . . 5_N, N designating the number of peripheral units. The peripheral units can in principle be any devices for input and/or output of data, such as, for example a bus adapter, a DSL line terminal, an Ethernet switch, a router, etc. In the sending direction (TX) the data are read out from the memory 4 and transferred to one of the peripheral units: In the receiving direction (RX) on the other hand the data are received by the DMA controller from one of the peripheral units and written into the memory 4.

As will be explained in greater detail below later, according to embodiments of the present invention, a priority control is used during the data transfer both in the sending direction and in the receiving direction, so that the data with the highest priority are transferred first by the DMA controller 1, the priorities, in one embodiment, are distinguished in each case at data burst level (for example with a volume of 32 to 64 bytes), i.e. in each case after transfer of a data burst it is newly decided by the DMA controller 1 whether in the meantime a data burst of higher priority is present, wherein in this case transfer of the data of the data stream previously being transferred is interrupted, in order first to transfer the data of the data stream with the higher priority to the desired destination.

Figure 4:
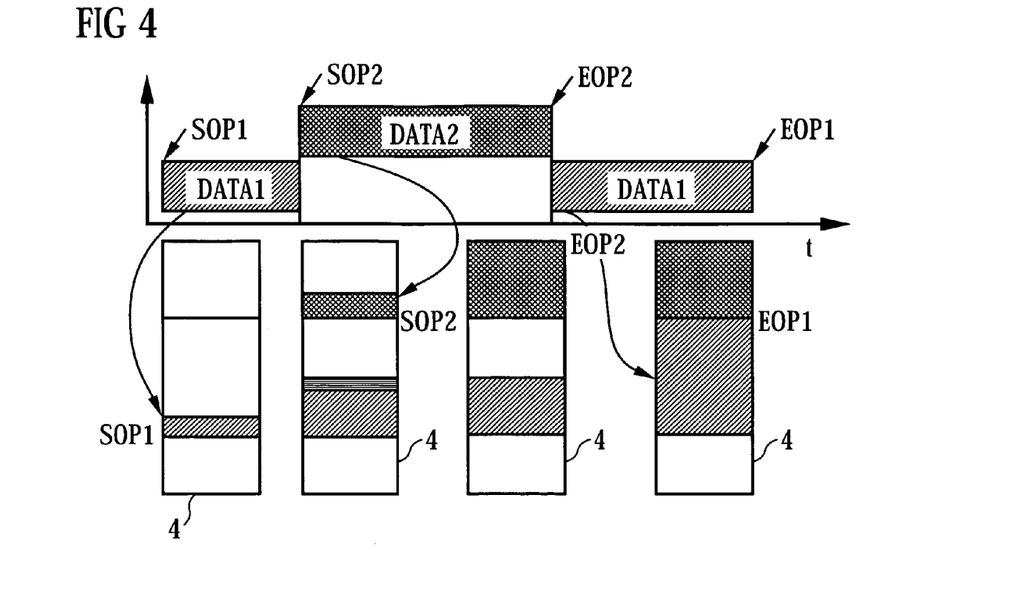
FIG. 4 illustrates an illustration to elucidate the function of the DMA controller illustrated in FIG. 1 during a data transfer in the receiving direction according to one embodiment.

FIG. 4 illustrates an example embodiment of a data transfer in the receiving direction, the occurrence of various data at the terminal of the DMA controller 1 coupled to the individual peripheral units 5_1-5_N being illustrated over the time t.

According to the embodiment illustrated in FIG. 4, firstly data DATA1 are applied to the DMA controller 1, wherein data DATA1 may be, for example, video data of peripheral unit 5_1, to which the priority 2 has been assigned. These data DATA1 are written into the memory 4 by the DMA controller 1. During the data transfer of data DATA1, data DATA2 from another peripheral unit, for example peripheral unit 5_2, occur, which have a higher priority than the data DATA1 previously being transferred. Data DATA2 may be voice data (e.g., voice over IP (VoIP) data), for example, with priority 1. When data, DATA2 occur the DMA controller 1 interrupts the data transfer of data DATA1 and instead operates data DATA2 with the higher priority and writes them into the memory 4. Only after completion of the data transfer of data DATA2 does the DMA control 1 return to the previously interrupted data stream DATA1 and write the remaining data DATA1 into the memory 4.

In FIG. 4, SOP1 or SOP2 designates the start of a data packet ("start of packet") of data DATA1 or DATA2, while EOP1 or EOP2 designates the end of the relevant data packet ("end of packet").

Figure 5:
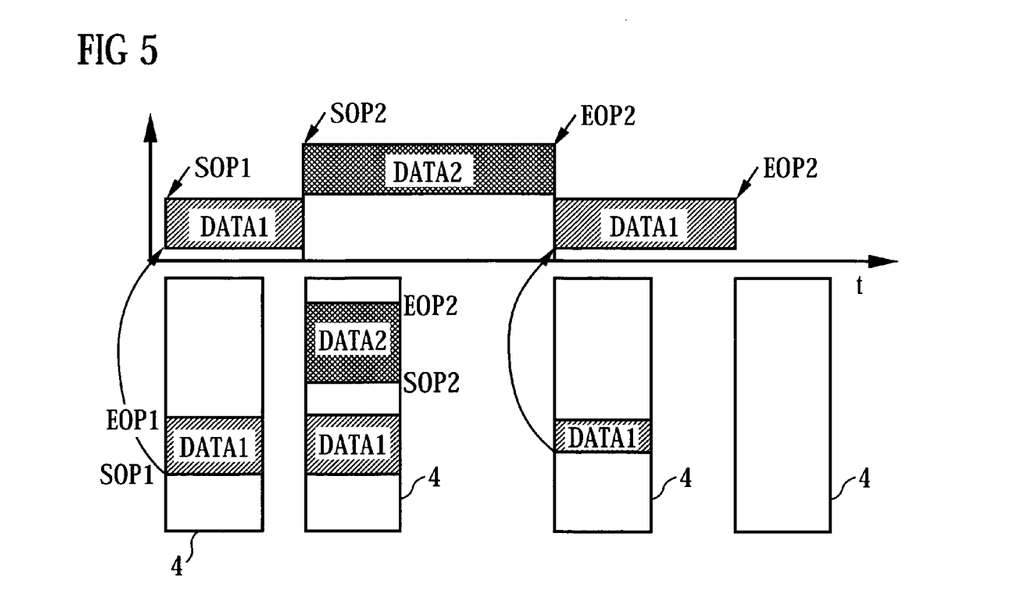
FIG. 5 illustrates an illustration to elucidate the function of the DMA controller illustrated in FIG. 1 during a data transfer in the sending direction according to one embodiment.

FIG. 5 illustrates an example embodiment of the priority-controlled data transfer by the DMA controller 1 in the sending direction. In FIG. 5, the data transfer from the memory 4 to the relevant peripheral 5_1-5_N is illustrated over the time t.

It is firstly assumed according to FIG. 5 that in the memory 4 a data block DATA1 is stored, to which the priority 2 is assigned. This data block DATA1 may again be, for example, video data which are to be transferred to peripheral unit 5_1. The DMA controller 1 starts to read out data DATA1 from the memory 4, in order to transfer them to peripheral unit 5_1. At a specific moment new data DATA2, which have been written into the memory 4 by a processor cooperating with the DMA controller 1, are present in the memory 4 in addition to data DATA1 which are still present. Data DATA2 may again be, for example, voice data (e.g., VoIP data) of priority 1, which therefore have a higher priority than data DATA1 previously read out from the memory 4 and transferred to peripheral unit 5_1. Consequently, the DMA controller 1 interrupts the data transfer of data DATA1 and immediately starts to read out and transfer data DATA2 to the desired peripheral unit, for example to peripheral unit 5_2. Only after completion of the data transfer of data DATA2 does the DMA controller 1 return to data DATA1 still present in the memory 4, in order to transfer the remaining data DATA1 to the desired peripheral unit 5_1.

Once the DMA controller 1 has to process data streams which are assigned to different priorities or priority classes, the respective priority is known or communicated to the DMA controller 1, so that the DMA controller 1 can deal with the data transfer to guarantee low delay time fluctuations ("jitters") and to produce the QoS service. The DMA controller 1 receives the information on the respective priority class of the data unit to be transferred either from the relevant peripheral unit (with a data transfer in the receiving direction) or from the processor (with a data transfer in the sending direction), in the latter case in particular a descriptor list being used in which the data to be transferred are stored by the processor, which in one embodiment is an "embedded processor" constructed with the DMA controller 1 on a common silicon substrate.

After the DMA controller 1 has been started it checks continually and at regular intervals whether there are new data from the peripheral units 5_1-5_N or new, not yet used, data descriptors in the descriptor list. On ascertaining new data to be transferred the DMA controller starts on the data transfer of the data unit in the sending or receiving direction which has the highest priority. If during a data transfer in the sending or receiving direction new data occur with a higher priority than the data currently being transferred, the current data transfer is interrupted—as already previously described—and the data with the higher priority are transferred.

In one embodiment, the DMA controller 1 guarantees genuine full duplex functionality, as the data transfer in the sending direction and the data transfer in the receiving direction are carried out completely independently of one another, in particular priority modules independent of one another in the sending and the receiving direction being implemented.

Evaluation of the priorities of the data present and deciding which data are to be transferred next on the basis of the priorities ascertained is, in one embodiment, accomplished in each case after transfer of a data burst which may comprise a multiplicity of data units (for example with a total size of 64 bytes). This means that in the receiving direction this decision is made in each case after transfer of a data burst into the memory 4 and in the sending direction after transfer of a data burst to a specific peripheral unit 5_1-5_N. The size of the data burst is, in one embodiment, variable and programmable for both the sending and the receiving direction. If data with the highest priority class are to be transferred, the maximum delay until the start of the data transfer of these data is therefore the length of a data burst currently being transferred. Thus in a data transfer in the receiving direction the processor can process the data units with higher priority earlier, the DMA controller 1 informing the processor, such as in the form of an interrupt, of each fully transferred data unit. Moreover, this priority-based method guarantees that the processor can generate and activate new descriptor list entries for a data transfer in the sending direction without taking into account the state of the data transfer currently being carried out in the sending direction. The DMA controller 1 thus also supports QoS in the sending direction, as data units of an activated descriptor list entry with the highest priority are transferred first.

If several data blocks with the same priority occur simultaneously for transfer in one and the same transfer direction, the DMA controller 1 can switch over to data burst level between these data blocks, so that one data burst of one data packet and one data burst of the other data packet are processed and transferred alternately. This guarantees a minimum delay even if several data blocks with the same priority occur.

Figure 1:
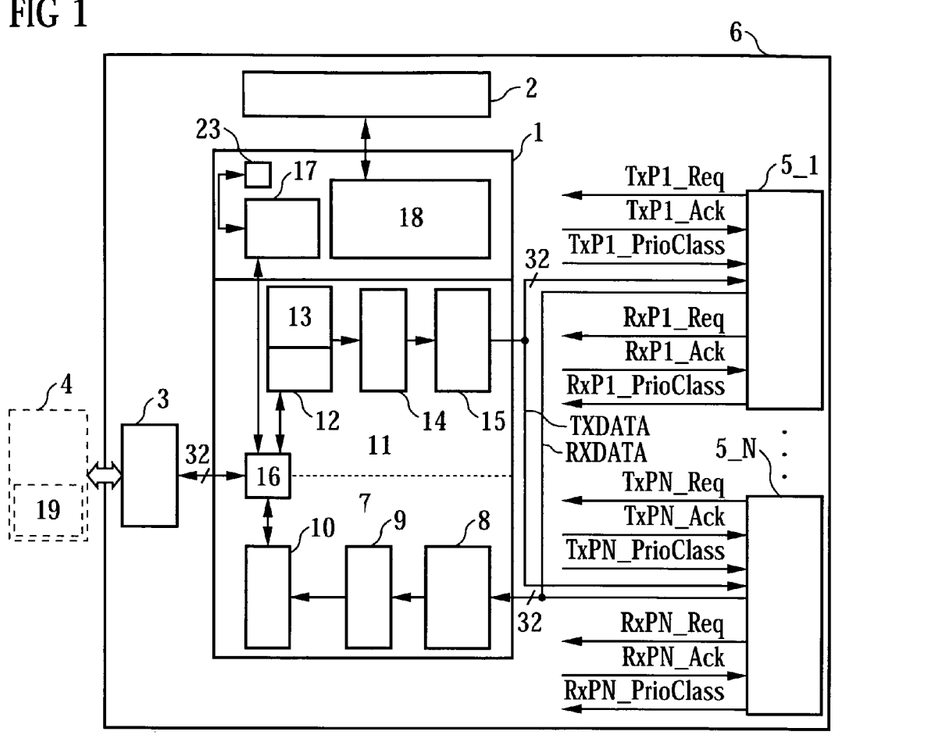
FIG. 1 illustrates a simplified block diagram of a DMA controller according to one embodiment.

FIG. 1 illustrates the structure of a DMA controller 1 according to one example embodiment, wherein the DMA controller 1 together with a processor 2 ("embedded processor"), a memory control 3 and several peripheral units 5_1-5_N are constructed on a common silicon substrate. The DMA controller 1 accesses a memory 4 via the memory control 3, in order to store data received from the peripheral units 5_1-5_N in the receiving direction in the memory 4 or to read out data from the memory 4 and transfer them to a desired peripheral unit 5_1-5_N in the sending direction.

The DMA controller 1 can substantially be divided into two main sections, namely a receiving section 7 and a sending section 11. The sending and receiving operations are independent of one another, wherein, however, only the receiving section 7 or the sending section 11 can access the memory 4 at any one time. To coordinate the memory accesses, the DMA controller 1 has a block 16, also designated as "arbiter block", which guarantees that only the receiving section 7, the sending section 11 or a descriptor manager 17 of the DMA controller 1, explained in greater detail below, can access the memory (4) for example a SDRAM memory, at any one time.

The data transfers carried out by the DMA controller 1 are carried out using several logical channels assigned to the individual peripheral units 5_1-5_N and corresponding priority classes. For example, four priority classes, assigned as follows to different kinds of data, can be supported by a peripheral unit in any transfer direction:

priority class 0: management data
priority class 1: voice data
priority class 2: video data
priority class 3: user data.

A smaller number of priority class here corresponds to a higher priority.

The number of priority classes supported depends on the type of peripheral unit, so the priority classes supported for each peripheral unit 5_1-5_N can vary both in the sending and the transfer direction between only one priority class and four different priority classes. Even if a peripheral unit supports only one priority class in a specific transfer direction, in principle any priority class can be assigned to the relevant data of this peripheral unit and the relevant transfer direction.

The logical channels exist only in the DMA controller 1 and in the correspondingly assigned descriptors of the descriptor lists, wherein the data transfers are actually carried out solely via the physical sending channel or the physical receiving channel.

The receiving section 7 is responsible for the transfer of data from a respective peripheral unit 5_1-5_N into the memory 4 using a relevant logical receiving channel. If data RXDATA are to be transferred into the memory 4 from a peripheral unit 5_1-5_N, the relevant peripheral unit first sends a request signal RxPi_Req, i=1 . . . N, to the DMA controller, wherein the priority class of the data to be transferred is simultaneously communicated by the relevant peripheral unit in the form of a message RxPi_PrioClass. On completion of a data transfer, i.e. when the data have been fully stored in the memory 4, an acknowledgement signal RxPi_Ack is transmitted by the DMA controller to the corresponding peripheral unit.

The receiving section 7 or the physical receiving channel can be divided into a receiving prioritization unit 8, a receiving intermediate memory 9 and a receiving DMA control unit 10. The receiving prioritization unit 8 is responsible for arranging the incoming data units (data packets/data cells) of the individual peripheral units 5_1-5_N according to the priority classes communicated in each case and for forwarding the data in the order arranged according to the priority classes to the receiving intermediate memory 9, this being in particular a FIFO memory ("first in first out") with the size of a data burst. The receiving DMA control unit 10 is responsible for the data transfer of the data intermediately stored in the receiving intermediate memory 9 into the memory 4.

The sending section 11, on the other hand, is responsible for the data transfer from the memory 4 to a desired peripheral unit 5_1-5_N using a relevant logical sending channel. One of the peripheral units can request a data transfer from the DMA controller 1 by means of a request signal TxPi_Req. As will be explained in greater detail below, the data transfer is done in the sending direction using descriptor lists 19, a descriptor list of this kind being stored in the memory 4 for each peripheral unit, i.e. for each logical sending channel. Activation of the relevant logical channels and generation of the relevant descriptors in the individual descriptor lists of these logical channels is done by the processor 2.

The sending section 11 comprises a sending DMA control unit 12, a sending prioritization unit 13, a sending intermediate memory 14 and a sending transfer unit 15. The sending prioritization unit 13 is responsible for selecting from the data units (data packets/data cells) stored in the memory 4 the data unit to be transferred next depending on the priorities assigned in each case. The sending DMA control unit 12 accesses the memory 4 depending on the decision of the sending prioritization unit 13, in order to transfer the selected data unit from the memory 4 into the sending intermediate memory 14, the sending intermediate memory 14, in some embodiments, having the size of a data burst analogous to the receiving intermediate memory 9. The sending transfer unit 15 is finally responsible for ensuring that the data units intermediately stored in the sending intermediate memory 14 are transferred to the desired peripheral units 5_1-5_N in the form of sending data TXDATA before the sending intermediate memory 14.

Once a data packet requested by a peripheral unit has been transferred by the DMA controller 1 to the relevant peripheral unit, an acknowledgement TxPi_Ack is sent to the relevant peripheral unit by the DMA controller 1. Additionally, the priority class of the transferred data is communicated in the form of a signal TxPi_PrioClass.

As illustrated in FIG. 1, the DMA controller 1 additionally comprises two further blocks 17 and 18, wherein block 17 can be designated as descriptor manager and block 18 as DMA manager.

Figure 6:
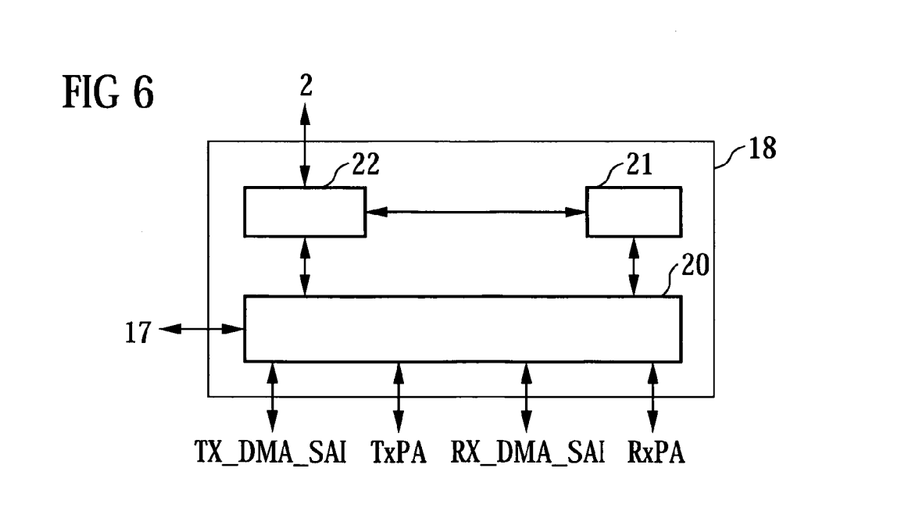
FIG. 6 illustrates one embodiment of a schematic block diagram of a DMA manager illustrated in FIG. 1.

The basic structure of one embodiment of a DMA manager 18 is illustrated in FIG. 6.

The DMA manager 18 primarily is interface between the processor 2 and the DMA controller 1 and consequently has a bus adapter 22, which is connected on the one hand to the processor 2 and on the other hand to a register block 20 and an interrupt block 21. The interrupt block 21 serves to generate various kinds of interrupts for the processor 2, for example on completion of a data transfer. The register block 20 is an interface to other components of the DMA controller 2, such as, e.g. to the receiving and sending prioritization units 8, 13, in order to exchange with them control, configuration and status information RxPA or TxPA, or to the receiving or sending DMA control units 10, 12, in order likewise to exchange with them control, configuration and status information RX_DMA_SAI or TX_DMA_SAI. Moreover, the register block 20 also is an interface to the descriptor manager 17. Overall, the DMA manager 18 makes available the control, configuration and status functions of the DMA controller 1.

The main task of the descriptor manager 17 is care of the descriptor lists 19 filed in the memory 4 for all the logical channels. The descriptor list 19 of each logical channel is composed of several descriptor list entries, filed in the memory 4 according to a specific scheme. Each logical channel has its own descriptor list 19, wherein each descriptor list entry can have, for example, a width of 64 bits and comprises a data pointer to the relevant memory area, where the relevant data unit is stored, a data length field and various control/status bits. In a sending descriptor the data length field indicates the number of bits to be transferred. In a receiving descriptor, on the other hand, the data length field serves two purposes. When generating the descriptor, the processor 2 first writes the memory area available into the data length field, whereas when the descriptor is being used by the DMA controller 1 this data field length is updated by the DMA controller 1 with the number of valid bits actually written into the relevant memory area.

The control/status bits contained in the individual descriptor list entries may be different control/status bits depending on whether this is a sending or receiving descriptor. An example is a bit which indicates whether or not the relevant descriptor is covering the start ("start of packet" SOP) and/or the end ("end of packet" EOP) of a data packet. A further important status/control bit of each descriptor is a bit which indicates whether the relevant descriptor or descriptor list entry is assigned to the processor 2 or the DMA controller 1 or is "owned" by the processor 2 or the DMA controller 1, so this status/control bit can also be designated as OWN bit. If the descriptor list entry is not assigned to the processor 2, the processor 2 cannot describe or update the status of the relevant descriptor, whereas the processor 2 can however read the descriptor to check the status. In the same way the DMA controller 1 can change a descriptor list entry only if the descriptor list entry is assigned to the DMA controller 1 by this OWN bit, whereas in the other case only reading of the descriptor list entry by the CMA controller 1 is possible. The OWN bit consequently serves primarily to coordinate accesses by the processor 2 on the one hand and the DMA controller 1 on the other hand to the descriptor list entries filed in the memory 4.

One task of the descriptor manager 17 is processing the descriptor requests from the receiving DMA control unit 10 and the sending DMA control unit 12. Moreover, the descriptor manager 17 is also capable of accessing the descriptor list entries, looking ahead as far as possible, wherein the descriptor manager 17 can additionally also in particular learn from this that it takes note of descriptor list entries, the descriptions of which have been previously processed.

The descriptor manager is communication agent between the DMA controller 1 on the one hand and the processor 2 on the other hand and always makes available relevant descriptor list entries if there are relevant requests from the receiving DMA control unit 10 or the sending DMA control unit 12. Descriptors currently being processed are stored by the descriptor manager 17 in an internal DMA status memory 23, this being an intermediate memory of relatively small size, which can, for example, accommodate only up to three descriptors. In the event that the DMA controller 1 interrupts a current data transfer and starts a new transfer of data of higher priority, the descriptor manager 17 stores the current status of the previously processed descriptor in the internal DMA status memory 23 and accesses the descriptor list entry for the logical channel to be operated in respect of the data with the higher priority, in order to transfer the relevant descriptor list entry to the desired peripheral unit 5_1-5_N.

Figure 3:
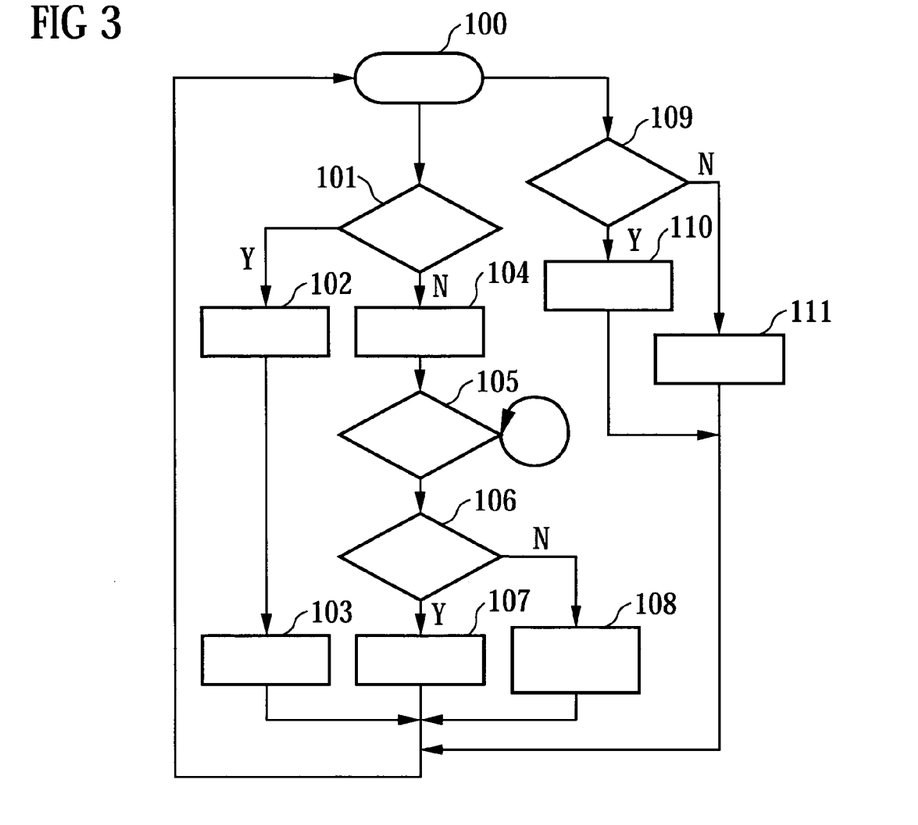
FIG. 3 illustrates a flow chart to elucidate the functioning of a descriptor manager illustrated in FIG. 1 according to one embodiment.

In FIG. 3 a flow chart is illustrated which elucidates the basic functioning of the descriptor manager 17 according to one embodiment.

After the descriptor manager 17 or the DMA controller 1 has been started (step 100) a check is first made as to whether there are requests by the receiving DMA control unit 10 or the sending DMA control unit 12 for descriptors of the logical channels currently being operated by these units. The descriptor manager 17 checks, for example, according to a simple "round robin" scheme the entry of requests of this kind from the receiving DMA control unit 10 and the sending DMA control unit 12.

As soon as the descriptor manager 17 has recognized that there is a request for a descriptor from one of these units and consequently this request must be operated, the DMA manager 18 checks whether the relevant descriptor list entry of the respective logical channel is currently being used by the DMA controller 1 (step 101).

If this is the case (cf. branch "Y"), the DMA manager 18 simply reads the requested descriptor out of the internal DMA status memory 23 (step 102) and forwards it to the requesting unit with the status valid in each case (step 103).

If, on the other hand, the requested descriptor list entry is not currently being used by the DMA controller 1 (cf. branch "N"), the DMA manager 18 first generates a request for memory access, in order to be able to read the relevant descriptor list entry (step 104) and waits for the input of the relevant descriptor list entry (step 105). As soon as the descriptor list entry has been able to be read from the memory 4, the descriptor manager checks whether the descriptor list entry is currently assigned to the processor 2 or the DMA controller 1 in the form of an "ownership" (step 106). If the descriptor is currently assigned to the DMA controller 1 (cf. branch "Y"), the descriptor manager 17 can forward the descriptor list entry with the valid status to the requesting unit (step 107). If, on the other hand, the requested descriptor list entry is assigned to the processor 2 (cf. branch "N"), the descriptor list entry cannot yet be forwarded to the requesting unit, but instead the receiving DMA control unit 10 and the sending DMA control unit 12 are informed that the requested descriptor list entry is currently being processed by the processor 2, so it is ensured that both units do not request the same descriptor list entry again until the processor 2 has completed processing the descriptor list entry (step 108). Simultaneously an interrupt is sent to the processor 2 to cause the processor 2 to abort the processing of the requested descriptor list entry.

If the receiving DMA control unit 10 and the sending DMA control unit 12 have completed the use of a current descriptor list entry, they send a request for a status update to the descriptor manager 17. The descriptor manager 17 alternates between two different status updates according to a "round robin" scheme. On input of a status update request the descriptor manager 17 first checks in relation to this whether the current data transfer has been fully completed, i.e. whether a complete data packet or a complete data cell has been successfully transferred (step 109). If this is the case (cf. branch "Y"), the descriptor manager 17 generates a request for memory access in order to update the relevant descriptor list entry in the memory 4 and generates interrupt status signals for the interrupt block 21 of the DMA manager 18 (step 110). If on the other hand in step 109 it is ascertained that the current data transfer has not yet been fully completed (cf. branch "N"), the descriptor manager 17 updates the current status for the descriptor list entry currently being processed in the internal DMA status memory 23 (step 111).

In general the descriptor manager 17 processes descriptor requests (cf. branch between 100 and 101 in FIG. 3) in preference to status update requests (cf. branch between 100 and 109 in FIG. 3).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for transferring data between a memory and peripheral units, the method comprising:

assigning priorities to the data to be transferred based on the respective type of data, wherein the respective type of data comprise management data, voice data, video data, and user data;

transferring the data by direct memory access (DMA) control between the memory and the peripheral units in conformity with the priorities assigned in each case, wherein assigning the priorities and transferring the data by DMA control in conformity with the priorities assigned in each case are performed independently for data transferred from the peripheral units to the memory and for data transferred from the memory to the peripheral units;

informing the DMA control of the priority for data to be transferred from a peripheral unit to the memory by the relevant peripheral unit, while informing the DMA control of the priority for data to be transferred from the memory to a peripheral unit by a processor cooperating with the DMA control;

wherein if data to be transferred with a higher priority than the data currently being transferred occur, interrupting the transferring of the data currently being transferred, in order first to transfer the data with the higher priority; and wherein if several data blocks are assigned a same high priority simultaneously for transfer in the same transfer direction, guaranteeing a minimum delay for transfer of the several data blocks having the same high priority.

2. The method of claim 1, wherein one of several available priorities is assigned to the data to be transferred for each peripheral unit.

3. The method of claim 1, comprising:

re-checking the priorities of the data to be transferred in each case after transferring of a data burst comprising a specific number of data units.

4. The method of claim 3, wherein the size of the data burst can be programmed.

5. The method of claim 1, wherein after transferring of the data with the higher priority, transferring of the data previously being transferred is continued.

6. The method of claim 1, comprising:

guaranteeing that only one access to the memory takes place for storing data in the memory or for reading data out of the memory at any one time.

7. The method of claim 1, comprising:
assigning a logical channel to each peripheral unit; and
assigning the priorities to the individual logical channels.

8. The method of claim 7, comprising:
generating a descriptor list for each logical channel, wherein the descriptor list comprises at least one descriptor with a pointer to a relevant data area in the memory.

9. The method of claim 8, wherein each descriptor comprises an item of information relating to the length of the data area and at least one control bit.

10. The method of claim 9, wherein the at least one control bit comprises a bit for coordinating write and read accesses to the memory by the DMA control and by a processor cooperating with the DMA control to thereby guarantee that either only the DMA control or only the processor can change a descriptor stored in the memory at any one time.

11. The method of claim 1, wherein the method is performed in a broadband data transfer network for transferring data via a broadband access.

12. A direct memory access (DMA) controller comprising:
transfer section configured to transfer data between a memory and peripheral units, wherein the data to be transferred has assigned priorities based on the respective type of data, wherein the respective type of data comprise management data, voice data, video data, and user data, wherein the transfer section comprises:
a receiving section configured to transfer data from the peripheral units to the memory; and
a sending section configured to transfer data from the memory to the peripheral units; and
prioritization controller configured to control the transfer of the data between the memory and the peripheral units in conformity with the priorities assigned in each case, wherein the prioritization controller includes one portion in the receiving section and one portion in the sending section which operate to control the receiving section and the sending section independently of one another to transfer the data via the receiving section or via the sending section in conformity with the priorities assigned in each case;
wherein the DMA controller is informed of the priority for data to be transferred from a peripheral unit to the memory by the relevant peripheral unit, while the DMA controller is informed of the priority for data to be transferred from the memory to a peripheral unit by a processor cooperating with the DMA controller;
wherein if data to be transferred with a higher priority than the data currently being transferred occur, the DMA controller is configured to interrupt the transferring of the data currently being transferred, in order first to transfer the data with the higher priority;
wherein if several data blocks are assigned a same high priority simultaneously for transfer in the same transfer direction, the DMA controller is configured to guarantee a minimum delay for transfer of the several data blocks having the same high priority.

13. The DMA controller of claim 12, wherein both the receiving section and the sending section include a DMA control unit configured to generate a request for access to the memory.

14. The DMA controller of claim 13, wherein both the receiving section and the sending section include an intermediate memory between the respective prioritization controller portion and the respective DMA control unit, wherein the intermediate memory is configured to intermediately store data to be transferred.

15. The DMA controller of claim 14, wherein the intermediate memory is configured to intermediately store data of a volume of one data burst, wherein a size of the data burst is programmable.

16. The DMA controller of claim 12, wherein a logical channel is assigned to each peripheral unit, wherein the memory comprises a descriptor list with at least one descriptor for each logical channel, wherein the descriptor has a pointer to a relevant data area of the memory.

17. The DMA controller of claim 16, wherein the DMA controller comprises:
coordination section configured to coordinate accesses to the descriptors of the descriptor lists stored in the memory for both transfer of data from the memory to the peripheral units and for transfer of data from the peripheral units to the memory.

18. The DMA controller of claim 17, wherein the DMA controller comprises:
an intermediate memory; and
wherein the coordination section is configured to respond to an occurrence of data with a higher priority than data currently being transferred, to abort the transfer of the data currently being transferred, file an item of information on the status of the data currently being transferred in the intermediate memory, and effect a transfer of the data with the higher priority.

19. The DMA controller of claim 12, wherein the DMA controller comprises:
a device configured to allow only one access to the memory by a receiving section or a sending section of the DMA controller at any one time.

20. The DMA controller of claim 12, wherein the DMA controller comprises:
an interface device configured to interface with a processor cooperating with the DMA controller, in order to exchange control, configuration and/or status information with the processor via the device.

21. The DMA controller of claim 20, wherein the interface device is configured to generate interrupts for the processor.

22. A system for transferring data between a memory and peripheral units, the system comprising:
means for assigning priorities to the data to be transferred based on the respective type of data, wherein the respective type of data comprise management data, voice data, video data, and user data;
means for transferring the data by direct memory access (DMA) control between the memory and the peripheral units in conformity with the priorities assigned in each case;
means for independently controlling data transferred from the peripheral units to the memory and data transferred from the memory to the peripheral units in conformity with the priorities assigned in each case;
means for informing the DMA control of the priority for data to be transferred from a peripheral unit to the memory by the relevant peripheral unit, while informing the DMA control of the priority for data to be transferred from the memory to a peripheral unit by a processor cooperating with the DMA control;
means for interrupting the transferring of the data currently being transferred, in order first to transfer the data with the higher priority if data to be transferred with a higher priority than the data currently being transferred occur; and
means for guaranteeing a minimum delay for transfer of the several data blocks having the same high priority if several data blocks are assigned a same high priority simultaneously for transfer in the same transfer direction.

23. A data transfer network comprising:
a direct memory access (DMA) controller including:
  transfer section configured to transfer data between a memory and peripheral units, wherein the data to be transferred has assigned priorities based on the respective type of data, wherein the respective type of data comprise management data, voice data, video data, and user data, wherein the transfer section comprises:
    a receiving section configured to transfer data from the peripheral units to the memory; and
    a sending section configured to transfer data from the memory to the peripheral units; and
  prioritization controller configured to control the transfer of the data between the memory and the peripheral units in conformity with the priorities assigned in each case wherein the prioritization controller includes one portion in the receiving section and one portion in the sending section which operate to control the receiving section and the sending section independently of one another to transfer the data via the receiving section or via the sending section in conformity with the priorities assigned in each case;
  wherein the DMA controller is informed of the priority for data to be transferred from a peripheral unit to the memory by the relevant peripheral unit, while the DMA controller is informed of the priority for data to be transferred from the memory to a peripheral unit by a processor cooperating with the DMA controller;
  wherein if data to be transferred with a higher priority than the data currently being transferred occur, the DMA controller is configured to interrupt the transferring of the data currently being transferred, in order first to transfer the data with the higher priority;
  wherein if several data blocks are assigned a same high priority simultaneously for transfer in the same transfer direction, the DMA controller is configured to guarantee a minimum delay for transfer of the several data blocks having the same high priority.

24. The data transfer network of claim 23 wherein the data transfer network is a broadband data transfer network.

\* \* \* \* \*